Aug. 6, 1935.  H. F. MARANVILLE  2,010,767
METHOD OF MAKING PNEUMATIC TIRES
Filed May 22, 1933  6 Sheets-Sheet 1

INVENTOR
Harvey F. Maranville
BY Evans & McCoy
ATTORNEYS

Aug. 6, 1935.  H. F. MARANVILLE  2,010,767
METHOD OF MAKING PNEUMATIC TIRES
Filed May 22, 1933  6 Sheets-Sheet 2

INVENTOR
Harvey F. Maranville
BY Evans & McCoy
ATTORNEYS

Aug. 6, 1935.  H. F. MARANVILLE  2,010,767
METHOD OF MAKING PNEUMATIC TIRES
Filed May 22, 1933   6 Sheets-Sheet 3

INVENTOR
*Harvey F. Maranville*
BY *Evans & McCoy*
ATTORNEYS

Aug. 6, 1935.  H. F. MARANVILLE  2,010,767
METHOD OF MAKING PNEUMATIC TIRES
Filed May 22, 1933   6 Sheets-Sheet 4

INVENTOR
Harvey F. Maranville
BY
Evans & McCoy
ATTORNEYS

Aug. 6, 1935.  H. F. MARANVILLE  2,010,767
METHOD OF MAKING PNEUMATIC TIRES
Filed May 22, 1933   6 Sheets-Sheet 5

INVENTOR
Harvey F. Maranville
BY Evans & McCoy
ATTORNEYS

Patented Aug. 6, 1935

2,010,767

UNITED STATES PATENT OFFICE 2,010,767

METHOD OF MAKING PNEUMATIC TIRES

Harvey F. Maranville, Akron, Ohio, assignor to The General Tire & Rubber Company, Akron, Ohio, a corporation of Ohio Application May 22, 1933, Serial No. 672,117

14 Claims. (Cl. 154—14)

This invention relates to the manufacture of pneumatic tires, and particularly to the manufacture of cord reinforced pneumatic tires or tire casings.

This invention has for an object to provide a rapid and economical method of making cord reinforced pneumatic tires which requires less apparatus and fewer and less difficult operations than methods heretofore employed.

A further object of the invention is to provide a method by which low pressure pneumatic tires of very small internal diameter can be economically manufactured but which also can be advantageously employed in the manufacture of pneumatic tires of all sizes and shapes.

A further object of the invention is to provide a method of building the fabric carcass of a tire by which a more perfect uniformity of spacing and angularity of the individual reinforcing cords is obtained, whereby a finished tire is of more uniform strength throughout.

A further object of the invention is to provide a method of making tires by which the use of air bags in the vulcanizing operation is eliminated.

A further object is to provide a method of making tires in which a layer of puncture sealing material may conveniently be built into the tire carcass in the tire building operation.

A further object is to provide a pneumatic tire which upon inflation positively grips the base of the rim or hub upon which it is mounted so that the tire is firmly held upon its base and circumferential slip is effectively resisted.

A further object is to provide a tire which in service transmits shocks of impacts largely to the base of the rim or hub with comparatively little lateral thrust on the tire retaining flanges of the rim.

Reference should be had to the accompanying drawings forming a part of this specification in which:

Fig. 26 is a sectional view showing a streamline airplane tire built by the method of the present invention;

Fig. 27 is a sectional view showing a small diameter low pressure tire built by the method of the present invention, this tire being of a form suitable for coaster wagons, invalid chairs, hospital beds, and the like;

Fig. 28 is a sectional view showing a tire of the type shown in Fig. 27 mounted on a wheel body consisting of flanged discs fitting within the central opening of the tire at opposite sides of the tire and connected by cross bolts.

Fig. 29 is a fragmentary sectional view showing a perforated annular tire base to which the tire is permanently secured by vulcanization.

In manufacturing tires by the method of the present invention, a tire carcass is built up upon an endless tubular rubber core which may be formed of uncured rubber, partially cured rubber or vulcanized rubber.

Figures 1, 2, 3, 4, 5, 6:
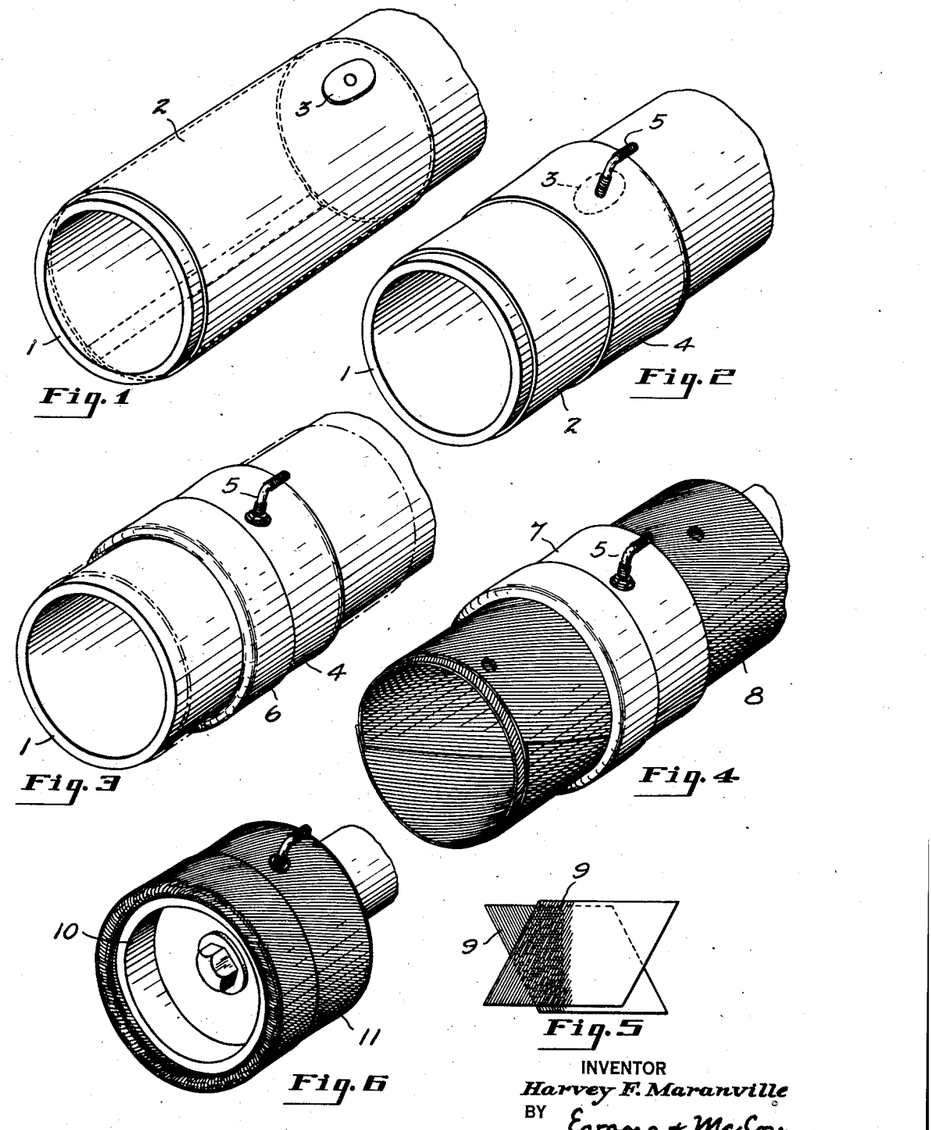
Figure 1 is a perspective view showing a cylindrical mandrel with a tube of rubber thereon.
Fig. 2 is a perspective view showing the tube on the mandrel folded back upon itself at one end, and a valve stem attached to the folded back portion.
Fig. 3 is a perspective view showing the opposite end of the rubber tube folded back to overlap the end portion first folded and joined thereto to form an annular circumferentially lapped rubber core tube with a valve stem secured to the exterior wall thereof and projecting outwardly.
Fig. 4 shows the transversely flat annular core tube formed as illustrated in Figs. 1 to 3 placed upon a tube of fabric on a mandrel.
Fig. 5 is a plan view showing the pieces of frictioned cord fabric which are wrapped upon a mandrel to form the fabric tube shown in Fig. 4.
Fig. 6 is a perspective view showing the tubular fabric folded back at its ends over the flat annular tube, the ends thereof being overlapped and stitched together.

This tubular core, which may be formed in various ways, is made in the form of a transversely flat annulus having a cylindrical interior wall and a cylindrical exterior wall contiguous to the interior wall. One method of making the annular core tube is illustrated in Figs. 1, 2 and 3. The first operation which is illustrated in Fig. 1 consists in placing upon a mandrel 1 a tube 2 of rubber of a diameter to fit upon the mandrel and of a length which is determined by the size of the tire to be formed. The mandrel 1 is preferably of a diameter substantially equal to the internal diameter of the tire to be formed, and, if the core tube is made of vulcanized rubber, the tube 2 may be cut from a straight cylindrical vulcanized tube of rubber and slipped upon the mandrel 1, after which a valve stem patch 3 is applied to the outer face of the tube. If the tire core is formed of unvulcanized rubber the tube 2 can be formed on the mandrel 1 from flat sheet rubber stock cut to the proper width and length to wrap about the mandrel so that its end edges will lap and join together along a longitudinal seam.

The second operation which is illustrated in Fig. 2 consists in folding back the ends of the tube 2 to which the valve stem patch 3 is applied, to form a cuff 4 as shown in Fig. 2. The valve stem 5 is then inserted in the cuff 4 through the patch 3 and the opposite end of the tube 2 is folded back to form a second cuff 6 which overlaps the cuff 4 and is adhesively joined to the cuff 4 throughout the circumference so as to form a transversely flat annular tube 7 of rubber which lies flat upon the cylindrical mandrel and which has interior and exterior walls of cylindrical form.

Pole vulcanized tubing such as is ordinarily used in making the core tube 7 has a rough outer face due to the fact that it is vulcanized with fabric wrapped tightly about it. It is desirable that this rough surface be at the outside of the core tube 7 so that the fabric carcass of the tire will be firmly vulcanized to the tube 7. In order to bring the rough side to the exterior, the tube 2 is reversed and has its rough surface on the inside when placed on the mandrel 1.

When the core tube 7 is made of unvulcanized rubber, the tire is preferably inflated with carbon dioxide in the vulcanizing mold.

After the transversely flat cylindrical core tube 7 is formed, as illustrated in Figs. 1, 2 and 3, a covering of cord fabric is applied thereto. The cord fabric, prior to application to the core tube, is built on the mandrel 1 or a similar mandrel into the form of a fabric tube 8 of substantially the same diameter as the core tube, by wraping successively on the mandrel pieces 9 of frictioned cord fabric which are cut at their ends parallel with the diagonally extending cords to provide pieces of parallelogrammatic shape of a length to wrap about the mandrel and overlap slightly at the ends where the tacky material is adhesively joined along a helical line. Successive layers of fabric in the fabric tube 8 are disposed with their cords at opposite inclination and at an angle to each other such that the angularity of the cords in the finished tire casing will be that desired.

The tube 8 of fabric is then placed upon a cylindrical mandrel 10, which is preferably of a width slightly less than the width of the cylindrical core tube, as shown in Fig. 6, the fabric tube being disposed with its opposite ends projecting beyond the ends of the mandrel, after which the rubber core tube 7 is placed on the mandrel over the fabric tube 8. The ends of the fabric tube are then cuffed back over and pressed against the cylindrical outer face of the annular core tube, the fabric at one or both ends of the tube being slit to accommodate the valve stem. The length of the fabric tube is such that the turned back cuffs overlap sufficiently upon the outer face of the core tube to form a firm union between the lapping ends. The cords of the fabric of the tube 8 which is not distorted in the formation of the tube lie in parallel helices. The cords in the central portion of the tube which is adhesively secured to the interior face of the core tube are not disturbed at all and there is no appreciable distortion of the fabric in overlapping cuffs turned back over the exterior cylindrical face of the core tube and lying flat thereon. The fabric covering so formed on the annular core tube and adhesively secured thereto throughout, conforms perfectly to the core tube and the cords of the fabric are uniformly spaced throughout.

Figures 7, 8, 9, 10, 11, 12:
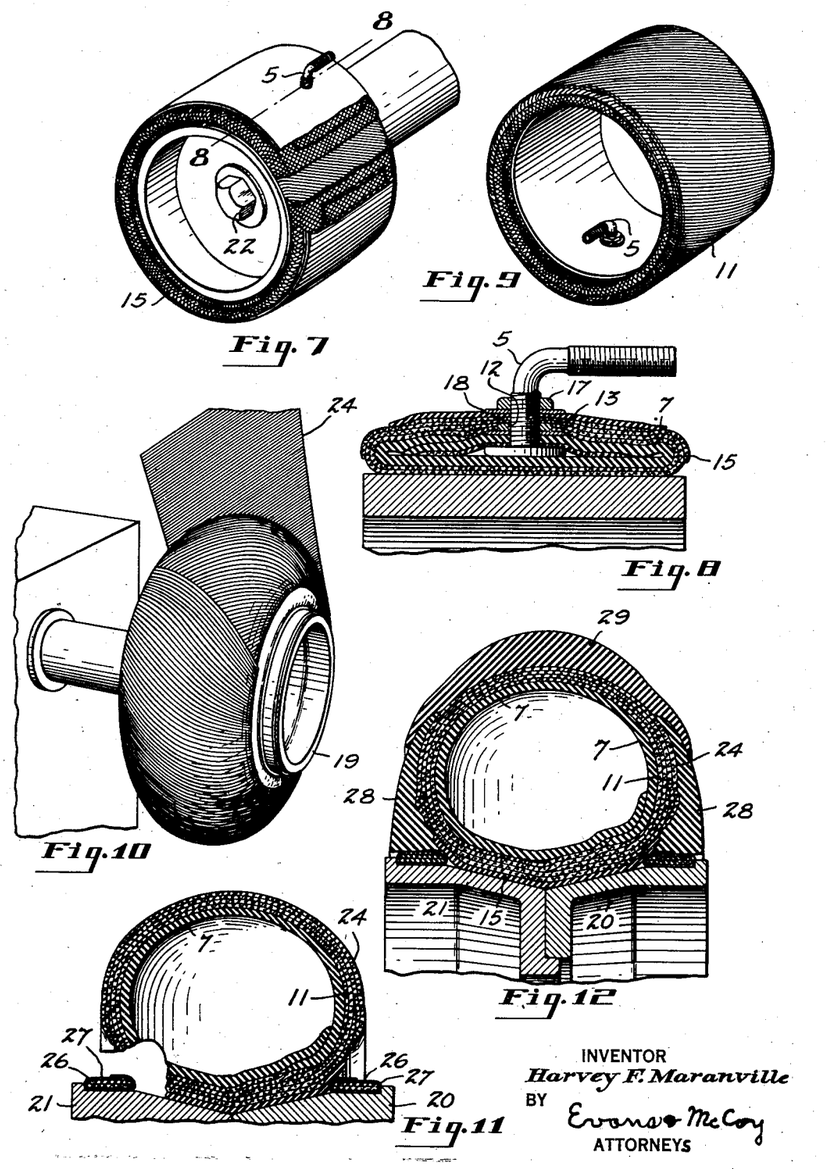
Fig. 7 is a perspective view showing layers of fabric and rubber applied to the exterior face of the fabric covered tube shown in Fig. 6.
Fig. 8 is a section taken on the line indicated at 8—8 in Fig. 7, showing the layers of rubber and fabric and the means for securing the valve stem in the wall of the tube.
Fig. 9 is a perspective view of the tube as shown in Figs. 7 and 8 reversed to bring the valve stem to the interior thereof.
Fig. 10 is a perspective view showing the tube of Fig. 9 placed upon a mandrel and inflated, and also showing an additional ply of cord fabric being applied to the exterior of the inflated tube.
Fig. 11 is a radial section through the tube shown in Fig. 10 and a portion of the mandrel upon which it is placed, showing the additional plies of fabric which have been applied to the inflated tube and fabric bead rings placed on the mandrel at opposite sides of the tube.
Fig. 12 is a radial section similar to Fig. 11 showing the exterior layers of rubber which are applied to the fabric tube while on the mandrel.
Figure 16:
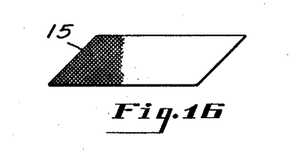
Fig. 16 is a plan view of the woven fabric which forms the chafer strip in the base of a tire.

As shown in Fig. 8 of the drawings the valve stem 5 is clamped to the wall of the core tube 7 prior to the application of the fabric covering 11 by means of a nut 12 and washer 13. After the fabric covering 11 has been applied to the core tube a chafer strip 15 preferably formed of stout woven fabric which extends the full width of the cylindrical outer face of the tube and which may overlap the opposite edges thereof as shown in Figs. 7 and 8 is applied to the outer face of the tube. The chafer strip 15, shown in Fig. 16, is a piece of frictioned fabric of a length corresponding to the circumference of the tube to which it is applied, and over the chafer strip there is laid a strip of raw rubber which may be somewhat narrower than the chafer strip.

After the outer layer of rubber has been applied, a second nut 17 and washer 18 are placed on the valve stem to clamp the reinforcing fabric and rubber which have been applied exteriorly to the tube.

Figure 25:
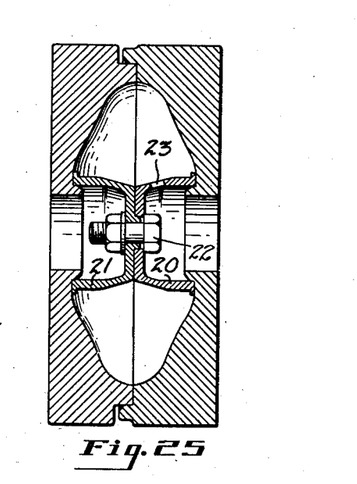
Fig. 25 is a sectional view showing a tire in a vulcanizing mold.

After the layers of fabric and rubber have been applied to the exterior surface of the tube, as shown in Figs. 7 and 8, the tube is removed from the mandrel 10 and reversed to bring the exterior reinforced face of the tube and valve stem to the interior as shown in Fig. 9. After reversal thereof, the transversely flat tube is placed upon a suitable rotatably mounted mandrel such as the mandrel 19, shown in Figs. 10, 11 and 12 which is of a width substantially equal to the base of the finished tire and which has a peripheral surface which conforms substantially to the hub or wheel rim upon which the finished tire is to be mounted. As shown in Figs. 11 and 12, the mandrel may consist of two separable reversely tapered conical sections 20 and 21 which may also serve as mold rings as shown in Fig. 25 forming the center or core of the mold in which the tire is vulcanized and which are held together and to the rotatable mandrel shaft by any suitable means such as a clamping bolt 22. The outer section 20 of the mandrel may be provided with an aperture 23 to accommodate the valve stem 5.

After the tube has been mounted upon the mandrel 19, air under pressure is admitted to the interior of the tube 7 through the valve stem 5, and this air under pressure within the tube gradually forces the tube toward a shape circular in axial cross section. The central portion of the interior wall of the core tube is, however, pressed against the surface of the mandrel by the internal air pressure, and this radial inward pressure, which is exerted on the overlapping ends of the covering fabric, offers resistance to the separation of the overlapping ends of the fabric. However, the lapped ends of the fabric can slip slightly at any point before the transverse pull on the fabric at this point becomes great enough to subject the cords to an undesirable amount of tension, the union between fabric ends being strong enough to limit transverse stretch but yielding enough to permit realinement of cords and equalization of tension. The rubber of the core tube, however, stretches circumferentially in the portions thereof which are forced outwardly to a greater diameter by the air pressure. The uniformly spaced cords adhesively secured together and to the exterior surface of the core tube 7, are progressively spread apart during the inflation of the tube by the air pressure, but since the rubber tube stretches uniformly throughout its circumference, and the air pressure is exactly the same at every point, substantially perfect uniformity of spacing of the cords is maintained throughout the tire.

Figure 17:
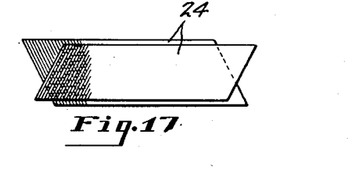
Fig. 17 is a plan view showing pieces of cord fabric which are wrapped upon the inflated tube, as shown in Fig. 10.

The fabric covering applied as illustrated in Figs. 3 to 6 may comprise as many plies as desired and all such plies of reinforcing cord fabric extend across the tire base. In some instances, however, it is desirable to provide additional plies of fabric in the tread and side walls. Such additional layers of cord fabric 24 may be applied to the tube after it has been placed upon the mandrel 10 and inflated. The external reinforcing fabric 24 preferably consists of pieces of bias cut cord fabric of a length corresponding to the external perimeter of the tube to which it is applied, the angularity of the cords of the fabric 24 being determined by the angularity assumed by the cords of the previously applied fabric upon inflation of the tube, and each strip as shown in Fig. 17 being of slightly less width than the strip beneath it.

Suitable beads may be applied to the tire carcass on the mandrel 19. As shown in Figs. 11 and 12 the beads are in the form of fabric rings which may be built up of frictioned cord fabric on the mandrel 19. As shown in these views, the bead consists of a core strip 26 and a cover strip 27 in both of which the cords extend longitudinally. In forming the beads the core strip 26 is wound flat around the mandrel and its ends spliced together. The folded core strip 27 is then wound centrally about the cylindrical fabric strip on the mandrel and its ends joined together after which the edges of the cover strip are cuffed over and joined together and to the core strip.

It will be observed that the diameter of the mandrel 19 is greater than the normal interior diameter of the tube annulus upon inflation and for this reason a transversely flattened base portion remains in contact with the mandrel and is held tightly against the mandrel by the internal air pressure.

After the external reinforcing fabric has been applied and the beads have been properly positioned against opposite sides of the inflated tube strips 28 of side wall rubber stock are applied to opposite sides of the tire carcass after which the tread rubber stock 29 is applied to the periphery thereof.

In applying the rubber stock to the tire carcass on the rotating mandrel 19 a perfectly balanced tire can be obtained by adding additional stock where needed throughout the circumference of the tire, additional stock being added opposite the valve stem to counterbalance the weight of the valve stem, a more perfect balance being possible than in methods previously employed for building tire casings in which the weight of the valve stem must be estimated, and a corresponding weight of rubber is added at a point which is marked on the tire casing.

After a tire has been built up on the mandrel 19 it is vulcanized in a tire mold provided with an annular cavity which has the shape of the finished tire casing. The detachable sectional mandrels 19 may also form the central core of a vulcanizing mold, or if desired the tire may be deflated and removed from the mandrel 19 after which it is mounted upon a core ring of a size and shape similar to that of the mandrel 19. The internal transverse perimeter of the mold cavity conforms substantially to the transverse perimeter of the tire carcass which has been built up from the mandrel, so that when the tire is inflated to a higher pressure within the mold the core tube 2 and its fabric covering are not stretched transversely to any material extent. The internal pressure to which the tire is subjected within the mold is, however, considerably in excess of the pressure to which it was subjected while on the mandrel 19 to force the walls thereof against the walls of the mold cavity and to force the rubber into the cavities of the mold.

Figure 13:
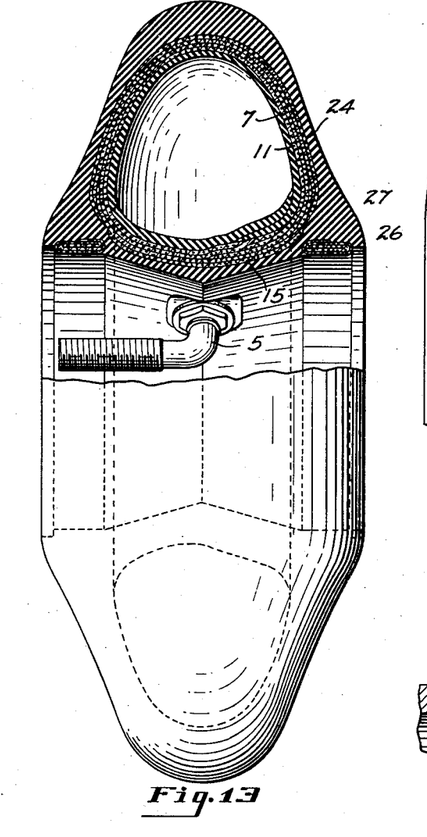
Fig. 13 is a sectional view showing an aeroplane tail skid tire made by the process illustrated in Figs. 1 to 12.
Figure 14:
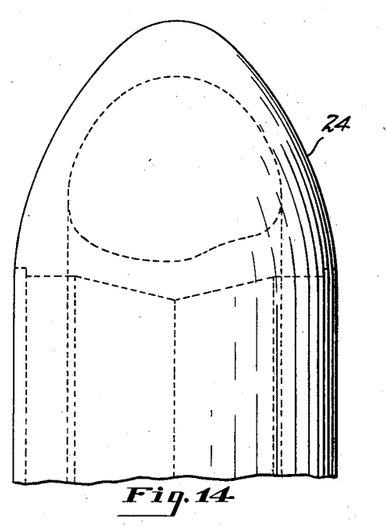
Fig. 14 is a sectional view showing the same tire inflated.

In molding a tire of streamline form, such as shown in Figs. 13 and 14, the external diameter of the tire is increased considerably in the mold by the internal air pressure, causing the tread portion of the tire to stretch circumferentially.

The space between individual cords in the tread portion of the tire is increased but the spacing remains uniform due to the uniform air pressure throughout the periphery of the tire.

Fig. 13 of the drawings shows a finished tire uninflated, the uninflated tire having a contour which conforms to the interior of the mold in which the tire was vulcanized. The inflation of the tire within the mold causes the rubber to flow around the bead rings and to firmly secure these rings in place. The tire molded and vulcanized to the form shown in Fig. 13 assumes the form shown in Fig. 14 upon inflation, which is the form which has been found to offer the least wind resistance. The tire illustrated in Fig. 13 is a tail-skid tire for airplanes and is designed for mounting on a hub having reversely inclined conical end portions tapering toward the center.

Figure 15:
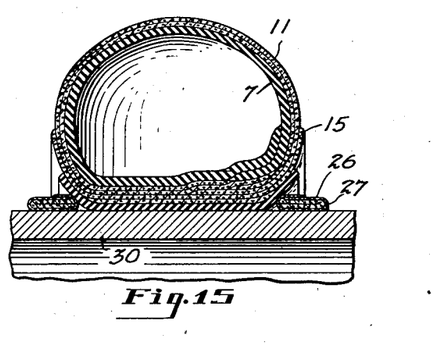
Fig. 15 is a sectional view showing a fabric reinforced tube which has been built up by the method illustrated in Figs. 1 to 9 mounted upon a cylindrical mandrel which may be used instead of the two piece mandrel shown in Figs. 10, 11 and 12.

If desired the base contour may be imparted to the tire in the vulcanizing mold, in which case the final tire building operations may be performed upon a cylindrical mandrel 30 such as shown in Fig. 15.

Figure 18:
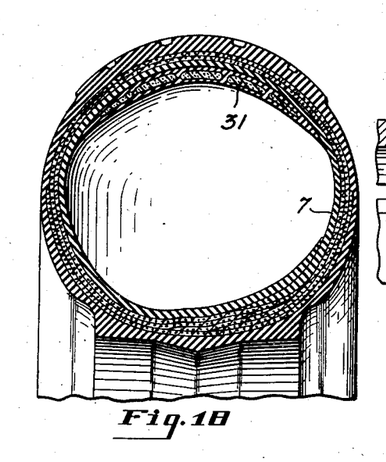
Fig. 18 is a sectional view showing a tire having a built-in puncture sealing strip.
Figure 19:
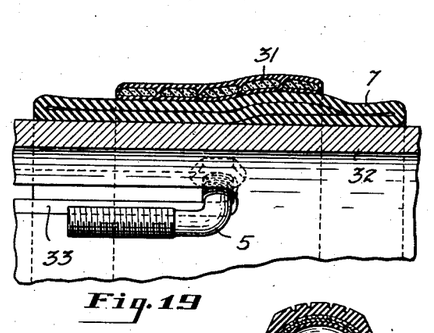
Fig. 19 is a sectional view showing a puncture sealing strip applied to the exterior of the transversely flat rubber core tube prior to the application of the fabric reinforcement.

The method of the present invention readily permits the building of a layer of puncture sealing composition into the tire carcass such as the sealing strip 31 in Fig. 18. The sealing strip may be applied to the interior of the rubber tube 2 prior to the operations shown in Figs. 1, 2 and 3 by placing the tube on the mandrel applying the sealing strip circumferentially to the tube midway between its ends and then turning the tube inside out to bring the sealing strip to the inside. The strip 31 of puncture sealing composition is preferably a cellular rubber strip, the cells of which are filled with a semi-fluid puncture sealing composition. If desired, the puncture sealing strip may be applied to the exterior of the rubber core tube 7 as illustrated in Fig. 18, in which case the strip 31 of puncture sealing material is interposed between the inner core tube 2 and the fabric reinforcement in the tread portion of the tire. When the sealing material is so applied, the core tube 2, after it has been formed, is reversed to bring the valve stem to the inside and placed upon a mandrel 32 provided with a slot 33 to receive the valve stem. The sealing strip is applied to the periphery after which the core tube is again reversed to receive the fabric covering which is then applied, as illustrated in Figs. 4 and 6.

While the method of the present invention was originally applied to the manufacture of low pressure tires of very small diameter, such as the airplane tailskid wheel shown in Figs. 13 and 14, and also tires for coaster wagons, hospital beds, invalid chairs, serving tables and the like, the method is, however, advantageously applicable to the manufacture of tires of all sizes and shapes including ordinary balloon and oversize low pressure tires for automobile wheels.

Figure 20:
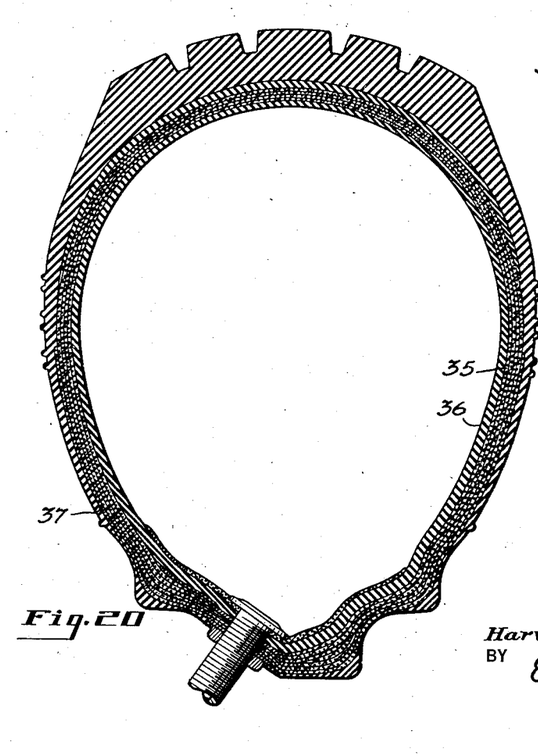
Fig. 20 is a sectional view showing an automobile tire of the balloon type produced by the method of the present invention.

In Fig. 20 there is shown a tire 34 of the balloon type suitable for mounting on drop center rims of automobile wheels. In this tire all of the reinforcing fabric plies 35 extend throughout the transverse circumference of the tire exteriorally of the core tube 36 and a chafer strip 37 extends across the base, which is shaped to conform to a drop center rim.

An important characteristic of all tires manufactured in accordance with the method of the present invention is that the base of the tire which is vulcanized to a diameter in excess of that to which the base would normally be forced by the air pressure within the tire, is contracted by the inflation pressure upon the rim or hub upon which it is mounted, positively gripping such rim or hub throughout its circumference, thereby effectually resisting circumferential slip and firmly holding the tire in place on the rim or hub. By reason of this gripping action of the tire, inextensible bead rings are not essential and may be omitted. In the tire shown in Fig. 20 the base of the tire is without bead rings and may be readily stretched sufficiently when the tire is uninflated to permit the tire to be worked over the rim flanges.

Figure 21:
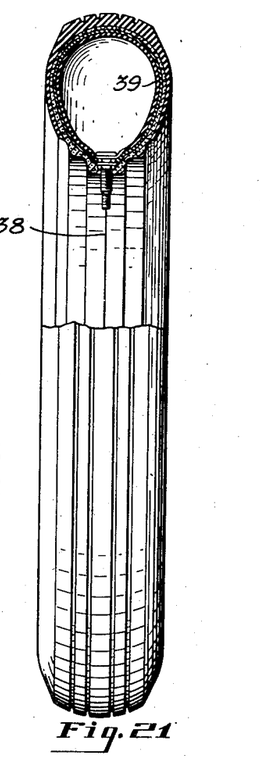
Fig. 21 shows an automobile tire such as shown in Fig. 20 which has its base split circumferentially and is provided with an inner tube.

While the tires produced by the method of the present invention are single tube tires, their bases, if desired, may be split along a central circumferential line as indicated at 38 in Fig. 21 so that the casing may be opened up to receive an inner tube 39.

One of the most important advantages of the present invention is that it provides a rapid and economical process of manufacture for pneumatic cord tires of extremely small internal diameter.

In manufacturing tires, such as automobile tires of larger internal diameter, it has been found more convenient to form the transversely flat core tube from straight cylindrical rubber tubing of a circumference corresponding to that of the transverse interior circumference of the tire to be formed.

Figure 22:
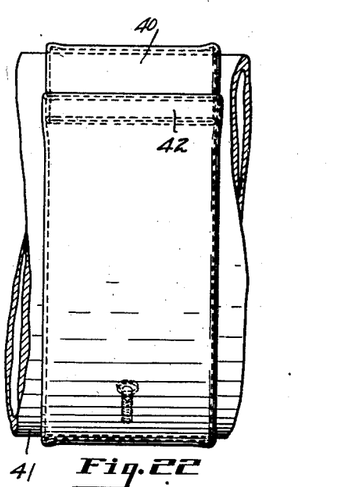
Fig. 22 shows an alternative method of forming the transversely flat endless core tube upon which the tire is built, by wrapping a length of straight tubing about a mandrel and splicing the ends thereof together.

As shown in Fig. 22 of the drawings a transversely flat core tube 40 is formed from straight tubing whose circumference corresponds to the transverse internal perimeter of the tire to be formed, which is cut to a length corresponding to the circumference of the mandrel 41, the diameter of which is substantially the same as the internal diameter of the tire to be formed. The tube is wrapped about and flattened upon the mandrel, the ends of the tubing being joined by a lap joint 42, the valve stem having been applied to the tubing prior to its application to the mandrel. The core tube formed as illustrated in Fig. 22 corresponds exactly to the core tube built as illustrated in Figs. 1 to 3, the subsequent operations being exactly the same for larger size tires as for small size tires.

Figure 23:
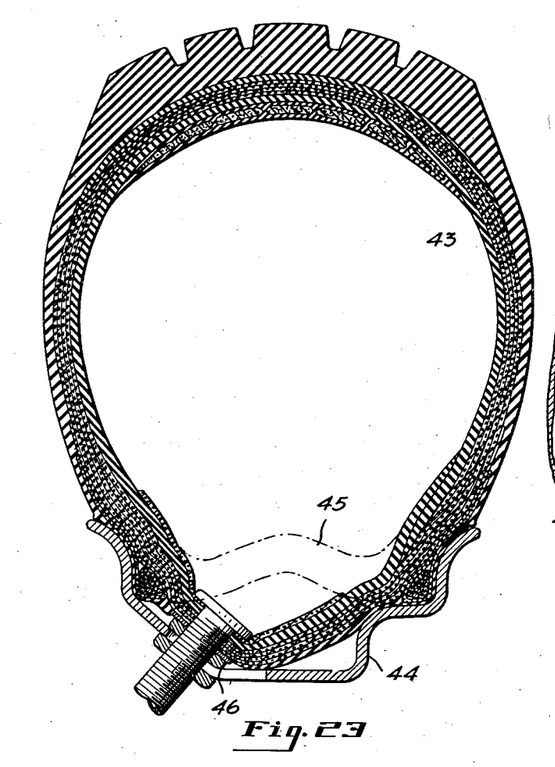
Fig. 23 is a sectional view showing a tire manufactured in accordance with the method of the present invention and having a form convenient for application to and removal from a drop center rim.
Figure 24:
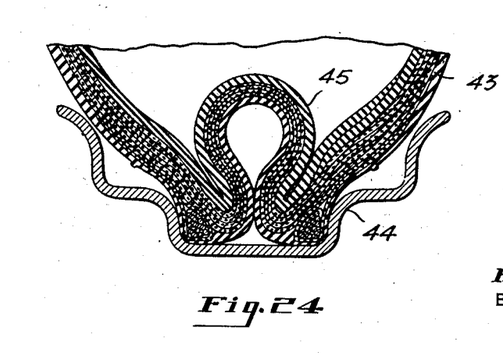
Fig. 24 is a sectional view showing how the base of the tire collapses into the well of the rim as the tire is being mounted on the rim.

In Figs. 23 and 24 of the drawings there is shown a balloon tire 43 similar to the tire 34 shown in Fig. 20, except as to the form of the base. The tire 43 is adapted to be mounted on a drop center rim 44 and its base 45 instead of being shaped to conform to the base of the rim is outwardly arched or concave in form, so that when the side portions of the base are squeezed together the central portion thereof will arch upwardly to permit the flange engaging portion of the base to enter the central well of the drop center rim to facilitate the application of the tire to the rim. The rim 44 may be provided with a transverse valve stem slot 46 to permit inward movement of the valve stem toward the center of the rim while the tire is being placed on the rim. When the tire 43 is inflated the arched central portion of the base is bowed radially inwardly into the well of the rim so that the tire is firmly held upon the rim.

Figures 26, 27, 28, 29:
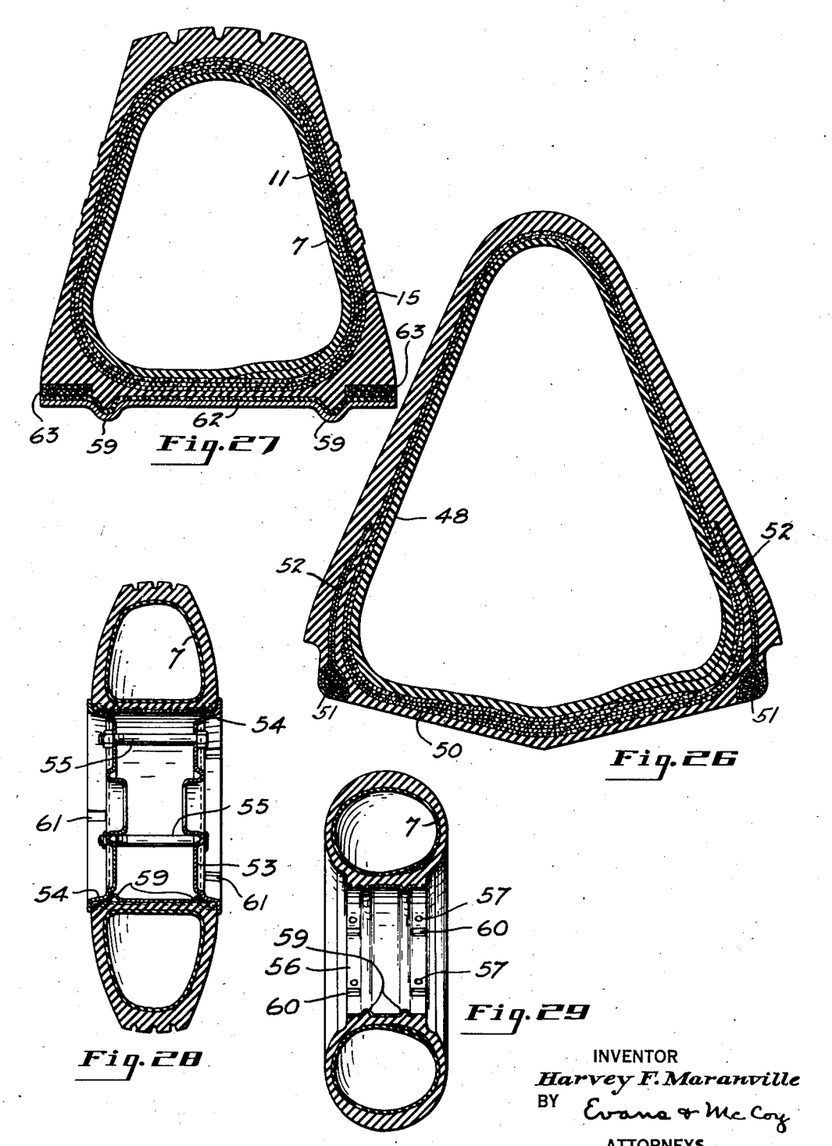

Fig. 26 of the drawings shows a tire of the airplane landing wheel streamline type having inner fabric plies 48 extending entirely around the transverse circumference, a chafer strip 50 across the base thereof, and wire beads 51 around which extend flipper strips 52 which extend a short distance up the side walls from the beads and entirely outside of the fabric carcass.

Fig. 27 of the drawings shows a small diameter tire of the radially deep tapering side wall type suitable for use on coaster wagons, hospital beds, invalid chairs and the like. In tires of this character but little internal air pressure is required and tires of this form may easily be built if desired with sufficient strength in the tire carcass to operate satisfactorily even though the internal air pressure be reduced to that of the atmosphere.

In Fig. 28 there is shown a mounting for small diameter, tires such as the tire shown in Fig. 27, in which the wheel body consists of discs 53 having flanged peripheries 54 which fit within the central opening of the tire on opposite sides thereof and which are held in place by cross bolts 55.

Tires of this character can be advantageously vulcanized upon a cylindrical metal band 56 provided with apertures 57 such as shown in Fig. 29. The band 56 may be provided with circumferential corrugations 59 which provide exterior grooves into which the rubber of the tire is forced during vulcanization and interior ribs forming stops for the mounting discs 53. The opposite edge portions of the band 56 are also preferably provided with inwardly pressed lugs 60 which fit in recesses 61 similarly formed in the flanges of the mounting discs 53. In building the tire, the band 56 serves as the mandrel upon which the final tire building operations prior to vulcanizing are performed as illustrated in Figs. 10, 11 and 12.

As best shown in Fig. 27, the base of the tire may be covered with a strip of cross woven fabric 62 which is preferably disposed with cords thereof extending circumferentially.

The tire may also be provided with suitable reinforcement at opposite edges of the base to resist stretching of the edge portions and maintain tight engagement between edge portions of the tire and the band 56. This reinforcement as illustrated in Fig. 27 consists of superposed strips 63 of cord fabric cut so that the parallel cords extend longitudinally of the strip and circumferentially of the tire.

The band of fabric 62 may be wrapped upon the metal band 56 before the mounting of the partially built tire thereon, and the strips 63 may be built into the tire in the same way as the bead strips 26 and 27 shown in Figs. 11 and 12.

Small tires may be made without a fabric carcass as illustrated in Figs. 28 and 29, in which case the tread and side wall rubber stock is applied directly to the tubular rubber core 7, the fabric applying operations illustrated in Figs. 4 and 6 being omitted, the core tube 7, after it is formed, being placed directly on the band 56 and inflated for the application of the exterior layer of rubber.

An advantageous characteristic common to all tires manufactured by the method of the present invention is that the tire retaining flanges of the rim or hub upon which the tire is mounted are relieved of the major portion of the lateral stresses due to internal air pressure and to shocks of impact upon the tire, these lateral stresses being taken largely by the integral base portion of the tire, the major portion of the load being transmitted to the base of the rim or hub instead of upon the side flanges as has been the case in pneumatic tires heretofore commonly used. This feature is of particular importance in connection with aeroplane landing wheels for the reason that terrific shocks of impact to which such tires are subjected often cause rupture of the tire retaining flanges.

By reason of the gripping action of the tire on the periphery of the hub or rim on which it is mounted, retaining flanges may be dispensed with and the tire may be mounted upon a concave hub which may be in the form of a pair of conical castings fitting within opposite side portions of the tire base and held together by bolts. In tires for coaster wagons, invalid chairs, hospital beds and the like, the wheel hub may consist simply of hub plates having its conical flanges which fit within opposite sides of the tire base.

The method of the present invention avoids the use of many of the most troublesome operations incident to the manufacture of pneumatic tire casings by methods heretofore employed. The difficulties incident to the application of cord fabric to the surface of a collapsible metal core which requires careful manipulation in the spacing of the individual cords throughout the tire carcass are eliminated. The use of expensive and complicated collapsible cores is made unnecessary and the building of cord tires of smaller internal diameter than can be built on such cores is made possible.

The vulcanizing operation is greatly simplified and cheapened by eliminating the use of air bags which have a short life and which greatly increase the cost of vulcanizing tire casings.

In addition, tires manufactured by this process have the reinforcing cords correctly positioned and uniformly spaced throughout the tire carcass, the tires are more perfectly balanced, low pressure tires whose internal diameter may be as small as desired are quickly and easily built, and all of the operations involved are so simple that they may be performed by unskilled labor.

Although several embodiments of the invention have been herein shown and described it will be understood that numerous details of the construction shown may be altered or omitted without departing from the spirit of this invention as defined in the following claims.

What I claim is:

1. The herein described method of making pneumatic tires which comprises forming an endless rubber core tube having transversely flat inner and outer faces and a tube of fabric of a diameter to conform to a transversely flat face of the core tube, assembling the core tube and fabric tube one within the other with one of the transversely flat faces of the core tube in contact throughout its circumference with the fabric tube and with the ends of the fabric tube projecting beyond opposite sides of the core tube, folding the opposite ends of the fabric tube back over the opposite transversely flat face of the core tube with the fabric edges overlapping, inflating the fabric covered tube, applying a rubber covering to the inflated fabric covered tube, and vulcanizing the tire in a mold.

2. The herein described method of making pneumatic tires which comprises forming an endless rubber core tube having transversely flat inner and outer faces and a tube of cord fabric of a diameter to conform to a transversely flat face of the core tube, assembling the core tube and fabric tube one within the other with one of the transversely flat faces of the core tube in contact throughout its circumference with the fabric tube and with the ends of the fabric tube projecting beyond opposite sides of the core tube, folding the opposite ends of the fabric tube back over the opposite transversely flat face of the core tube with the fabric edges overlapping, inflating the fabric covered tube, applying a rubber covering to the inflated fabric covered tube, and placing the tire so formed in a tire mold having a cavity shaped to conform to the finished tire, forcing the tire to conform to the interior of the mold cavity by internal air pressure, and vulcanizing the tire.

3. The herein described method of making pneumatic tires which comprises forming an endless rubber core tube, adhesively securing a covering of cord fabric upon said core tube, inflating said tube upon a mandrel of a diameter greater than normal internal diameter of the tube annulus upon inflation whereby a substantial portion of the interior of the tube annulus remains in contact with the mandrel when inflated to provide a transversely flattened base, applying a covering of rubber to the inflated tube, and vulcanizing the tire in a mold.

4. The herein described method of making pneumatic tires which comprises forming an endless rubber core tube, adhesively securing a covering of cord fabric upon said core tube, inflating said tube upon a mandrel of a diameter greater than normal internal diameter of the tube annulus upon inflation whereby a substantial portion of the interior of the tube annulus remains in contact with the mandrel when inflated to provide a transversely flattened base, applying reinforcing elements to the base portion of the inflated tube and a covering of rubber, and vulcanizing the tire in a mold.

5. The herein described method of making pneumatic tires which comprises forming an endless rubber core tube having transversely flat inner and outer faces and a tube of fabric of a diameter to conform to a transversely flat face of the core tube, assembling the core tube and fabric tube one within the other with one of the transversely flat faces of the core tube in contact throughout its circumference with the fabric tube and with the ends of the fabric tube projecting beyond opposite sides of the core tube, folding the opposite ends of the fabric tube back over the opposite transversely flat face of the core tube, inflating the fabric covered tube, upon a mandrel which fits within the transversely flat tube annulus, applying a rubber covering to the inflated tube and vulcanizing the tire in a mold.

6. The herein described method of making pneumatic tires which comprises forming an endless rubber core tube having transversely flat interior and exterior walls and having a valve stem secured to one of the transversely flat walls, forming a tube of cord fabric of a diameter to conform to a transversely flat wall of the core tube, assembling the core tube and fabric tube one within the other with the transversely flat wall of the core tube opposite the wall from which the valve stem projects in contact throughout its circumference with the fabric tube and with the ends of the fabric tube projecting beyond opposite sides of the core tube, folding the opposite ends of the fabric tube back over the core tube and lapping the same, applying rubber and an additional fabric reinforcement to the transversely flat face from which the valve stem projects, placing the tube on a mandrel which fits within the face of the tube to which the rubber and additional fabric has been applied, inflating the tube, applying a covering of rubber to the exposed portions of the tube, and vulcanizing the tire in a mold.

7. The herein described method of making pneumatic tires which comprises forming an endless rubber core tube having transversely flat interior and exterior walls and having a valve stem secured to one of the transversely flat walls, forming a tube of cord fabric of a diameter to conform to a transversely flat wall of the core tube, assembling the core tube and fabric tube one within the other with the transversely flat wall of the core tube opposite the wall from which the valve stem projects in contact throughout its circumference with the fabric tube and with the ends of the fabric tube projecting beyond opposite sides of the core tube, folding the opposite ends of the fabric tube back over the core tube and lapping the same, applying rubber and an additional fabric reinforcement to the transversely flat face from which the valve stem projects, placing the tube on a mandrel which fits within the face of the tube to which the rubber and additional fabric has been applied, inflating the tube, applying a covering of rubber to the exposed portions of the tube, clamping the tire so built in a mold having an annular cavity conforming to the shape of the finished tire, forcing the walls of the tire to conform to the walls of the mold cavity by internal air pressure, and vulcanizing the tire.

8. The herein described method of making pneumatic tires which comprises forming an endless rubber core tube having transversely flat interior and exterior walls and having a valve stem secured to one of the transversely flat walls, forming a tube of cord fabric of a diameter to conform to a transversely flat wall of the core tube, assembling the core tube and fabric tube one within the other with the transversely flat wall of the core tube opposite the wall from which the valve stem projects in contact throughout its circumference with the fabric tube and with the ends of the fabric tube projecting beyond opposite sides of the core tube, folding the opposite ends of the fabric tube back over the core tube and lapping the same, applying rubber and an additional fabric reinforcement to the transversely flat face from which the valve stem projects, placing the tube on a mandrel which fits within the face of the tube to which the rubber and additional fabric has been applied, inflating the tube, applying additional fabric to the side walls and tread portion of the inflated tube, applying a covering of rubber, and vulcanizing in a mold.

9. The herein described method of making pneumatic tires which consists in forming a transversely flat endless core tube having an attached valve stem, forming a tube of fabric of a diameter to fit within the core tube annulus, placing the fabric tube and core tube on a mandrel with the core tube valve stem projecting outwardly and the core tube disposed exteriorly to the fabric tube and intermediate the ends of the fabric tube, cuffing the ends of the fabric tube over the exterior face of the core tube to form a fabric cover over the entire tube, reversing the tube to bring the valve stem to the inside thereof, inflating the tube, applying a rubber covering to the inflated tube, and vulcanizing the tire in a mold.

10. The herein described method of making pneumatic tires which consists in forming a transversely flat endless core tube having an attached valve stem, forming a tube of fabric of a diameter to fit within the core tube annulus, placing the fabric tube and core tube on a mandrel with the core tube valve stem projecting outwardly and the core tube disposed exteriorly of the fabric tube and intermediate the ends of the fabric tube, cuffing the ends of the fabric tube over the exterior face of the core tube to form a fabric cover over the entire tube, applying layers of rubber and reinforcing fabric to the exterior face of the fabric covered tube, reversing the tube to bring said exterior face to the interior, placing the tube upon a mandrel which fits within the reversed tube, inflating the tube, applying a rubber covering to the inflated tube, and vulcanizing the tire in a mold with the walls thereof pressed against the walls of the mold cavity by internal air pressure.

11. The herein described method of making pneumatic tires which consists in forming a transversely flat endless core tube having an attached valve stem, forming a tube of fabric of a diameter to fit within the core tube annulus, placing the fabric tube and core tube on a mandrel with the core tube valve stem projecting outwardly and the core tube disposed exteriorly of the fabric tube and intermediate the ends of the fabric tube, cuffing the ends of the fabric tube over the exterior face of the core tube to form a fabric cover over the entire tube, applying layers of rubber and reinforcing fabric to the exterior face of the fabric covered tube, reversing the tube to bring said exterior face to the interior, placing the tube upon a mandrel which fits within the reversed tube, inflating the tube, applying bead rings to opposite sides of the base of the tube engaging the mandrel, applying a covering of rubber, and vulcanizing the tire in a mold.

12. The herein described method of making pneumatic tires which comprises forming an endless rubber core tube having transversely flat inner and outer faces and a tube of fabric of a diameter to conform to a transversely flat face of the core tube, assembling the core tube and fabric tube one within the other with one of the transversely flat faces of the core tube in contact throughout its circumference with the fabric tube and with the ends of the fabric tube projecting beyond opposite sides of the core tube, folding the opposite ends of the fabric tube back over the opposite transversely flat face of the core tube with the fabric edges overlapping, inflating the fabric covered tube, applying a rubber covering to the inflated fabric covered tube, placing the tire in a vulcanizing mold having a mold cavity whose external diameter exceeds that of the built up tire, forcing the tread portion of the tire against the exterior periphery of the mold cavity by internal air pressure, and vulcanizing the tire.

13. The herein described method of making pneumatic tires which comprises forming a transversely flat endless rubber core tube and a tube of fabric of a diameter to fit within the core tube annulus and of a length sufficient to wrap transversely around the core tube, placing the fabric tube within the core tube and cuffing the ends thereof over the flat exterior face of the tube, applying rubber to the exterior faces of the tube, reversing the flat fabric covered tube to bring the rubber covered portion in which the circumferential edges of the fabric are located to the interior of the annulus, inflating the tube, applying a covering of rubber to the uncovered portion of the fabric, and vulcanizing the tire in a mold.

14. The herein described method of making pneumatic tires which comprises forming a transversely flat endless rubber core tube having an attached valve stem, applying a layer of puncture sealing composition to the wall of the tube opposite that from which the valve stem projects, applying a covering of cord fabric to the tube, inflating the fabric covered tube, applying a covering of rubber to the inflated tube, and vulcanizing the tire in a mold.

HARVEY F. MARANVILLE.